(12) United States Patent  (10) Patent No.: US 8,943,900 B2
Rezgui et al.  (45) Date of Patent: Feb. 3, 2015

(54) METHOD AND APPARATUS FOR DIFFERENTIAL PRESSURE MEASUREMENT

(75) Inventors: Fadhel Rezgui, Bievres (FR); Alain Buisson, Saintry sur Seine (FR); Eric Paul Donzier, Bercheres sur Vesgre (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 472 days.

(21) Appl. No.: 13/499,813

(22) PCT Filed: Oct. 4, 2010

(86) PCT No.: PCT/US2010/051353
§ 371 (c)(1),
(2), (4) Date: May 13, 2012

(87) PCT Pub. No.: WO2011/041794
PCT Pub. Date: Apr. 7, 2011

(65) Prior Publication Data
US 2012/0216628 A1    Aug. 30, 2012

Related U.S. Application Data

(60) Provisional application No. 61/247,975, filed on Oct. 2, 2009.

(51) Int. Cl.
*G01F 1/34* (2006.01)
*E21B 47/06* (2012.01)
*G01F 1/36* (2006.01)
*G01F 1/44* (2006.01)
(Continued)

(52) U.S. Cl.
CPC ............. *E21B 47/06* (2013.01); *G01F 1/363* (2013.01); *G01F 1/44* (2013.01); *G01L 9/04* (2013.01); *G01L 19/04* (2013.01)
USPC ....................................................... 73/861.42

(58) Field of Classification Search
USPC .............................................. 73/861.42, 716
See application file for complete search history.

(56) References Cited

U.S. PATENT DOCUMENTS

| | | |
|---|---|---|
| 4,757,709 A | 7/1988 | Czernichow |
| 5,736,650 A | 4/1998 | Hiron et al. |
| 6,023,978 A | 2/2000 | Dauenhauer et al. |

(Continued)

FOREIGN PATENT DOCUMENTS

EP    1783475    9/2007

*Primary Examiner* — Lisa Caputo
*Assistant Examiner* — Jamel Williams
(74) *Attorney, Agent, or Firm* — Cameron R. Sneddon

(57) ABSTRACT

A system and method for determining pressure differences of a fluid flowing through a differential pressure conduit positioned in a wellbore. The system comprises a first pressure measurement circuit positioned at a first pressure measuring station and including a first pressure sensor to generate a first pressure measurement signal indicative of the pressure measured by the first pressure sensor at a first signal point, and a second pressure measurement circuit positioned at a second pressure measuring station and including a second pressure sensor to generate a second pressure measurement signal indicative of the pressure measured by the second pressure sensor at a second signal point. The calculation of the pressure differential between the first and second pressure measuring stations is based on the first and second pressure measurement signals taken or read from the first and second signal points, wherein the first and third second points are symmetrical.

32 Claims, 11 Drawing Sheets

(51) Int. Cl.
  *G01L 9/04* (2006.01)
  *G01L 19/04* (2006.01)

(56) References Cited

U.S. PATENT DOCUMENTS

| | | |
|---|---|---|
| 7,114,401 B2 | 10/2006 | Peter |
| 8,061,219 B2 | 11/2011 | Rezgui et al. |
| 2002/0134163 A1 | 9/2002 | Clifford |
| 2004/0079159 A1 | 4/2004 | Muchow |
| 2006/0037408 A1* | 2/2006 | Peter .................. 73/861.63 |
| 2006/0219021 A1 | 10/2006 | Kurtz et al. |
| 2008/0060846 A1* | 3/2008 | Belcher et al. .................. 175/25 |
| 2008/0066555 A1* | 3/2008 | Rezgui et al. .................... 73/716 |
| 2011/0114387 A1* | 5/2011 | Belcher et al. .................. 175/57 |
| 2012/0308174 A1* | 12/2012 | Head ................................ 385/13 |

* cited by examiner

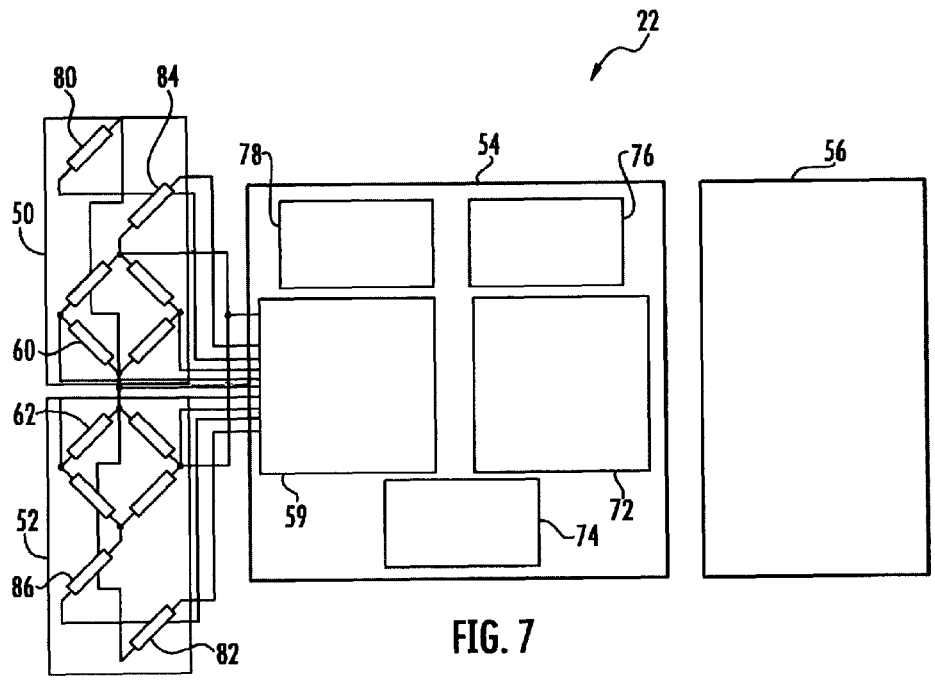
FIG. 7
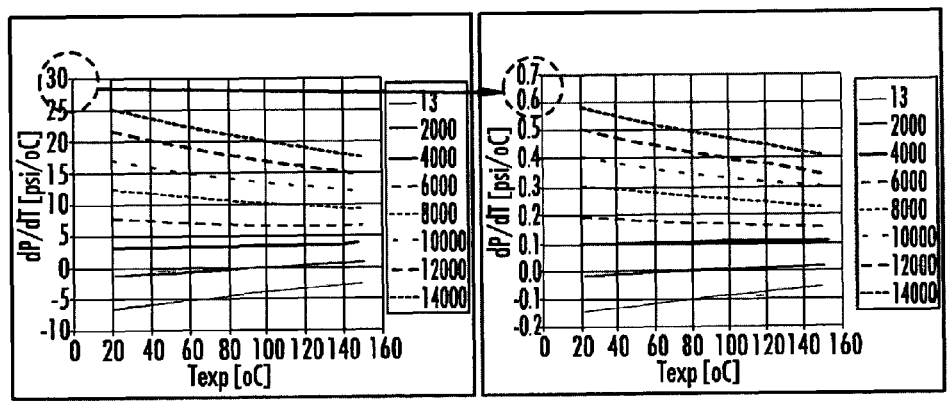
FIG. 8A
FIG. 8B

METHOD AND APPARATUS FOR DIFFERENTIAL PRESSURE MEASUREMENT

CROSS-REFERENCE TO RELATED APPLICATIONS

This application claims the benefit of U.S. Provisional Application No. 61/247,975, filed Oct. 2, 2009, which is incorporated herein by reference in its entirety.

BACKGROUND OF THE INVENTION

1. Field of the Invention

The present disclosure relates generally to the field of hydrocarbon fluid measurements, and relates more particularly, but not by way of limitation, to a method and apparatus for measuring the flow rate of a fluid in a hydrocarbon well.

2. Brief Description of Related Art

Differential pressure measurement can allow a determination of fluid flow rate when combined with various physical properties of a fluid, such as density. Current methods for measuring pressure differences consist of utilizing either a differential pressure sensor/gauge or two absolute pressure sensors. Differential pressure gauges are extremely difficult and sometimes impossible to implement in downhole oilfield applications. Most differential pressure gauges, for accurate measurement of small differential pressures (in the range of 1 to 100 psi), require a very thin sensitive membrane (about 10-50 micron thick), have trouble withstanding large pressure surges on the order of a few hundreds, or a few thousands of psi, or acceleration during mechanical shocks. For example, severe pressure surges and extreme mechanical shocks often occur downhole in hydrocarbon wells from events such as perforating. Moreover, differential pressure gauges generally require a column of the hydraulic fluid flowing through the downhole wellbore. However, these differential pressure gauges have difficulty when that fluid is contaminated, leading to inaccurate measurements.

Heretofore, uses of absolute pressure sensors have been deployed in downhole conditions in order to compute differential pressure data however, until now, the computed accuracy and resolution resulting from the absolute pressure gauges do not provide the pressure differences of the order of a few percent of psi (i.e., 0.01 psi) required for accurate flow rate measurements, especially at lower flow rates. Absolute pressure sensors using known sensing technology, such as Quartz, Crystal Quartz Gauge, Sapphire, and the like, have failed to provide the transient response necessary for accurate flow rate measurements when fluid pressure drastically changes. Moreover, independently powered absolute pressure sensors based on an array of strain resistors comprising the elements of a Wheatstone bridge, have heretofore caused calculation errors or deviations within the output of these sensors due to divergent effects from having independent power supplies and/or circuitry.

As an example, U.S. Pat. No. 7,114,401 issued on Oct. 3, 2006 is directed towards a flow measurement system for steady-state and transient flow, particularly suitable for the drilling domain. The '401 reference, however, measures differential pressure by measuring the radial deformation, changes in the hoop strain/stress, of a sleeve upstream and downstream of a Venturi type section. On the contrary, the present disclosure is not directed to measuring deformation of the sleeve of a tool for obtaining differential pressure measurements.

It is therefore desirable to provide a method and apparatus for differential pressure measurement (e.g., which also can be referred to herein as a "system") that takes advantage of the symmetry of at least two Wheatstone bridges in electrical connection, wherein the Wheatstone bridges are preferably selected, tested, and calibrated so as to minimize or cancel all common effects (i.e. temperature, power supply, drift, inelasticity, dynamic response, and the like), thereby addressing the above and other problems.

SUMMARY OF THE DISCLOSURE

In view of the foregoing disadvantages inherent in the known types of methods and apparatus' present in the prior art, exemplary implementations of the present disclosure are directed to a method and apparatus for differential pressure measurement. Exemplary apparatus, methods and systems thus provide a new and useful technique that capitalizes on symmetrical reference signal points and common characteristics of two Wheatstone bridges in order to cancel all, or substantially all, common mode effects, which avoids many of the defects and disadvantages of the prior art mentioned heretofore, and includes many novel features which are not anticipated, rendered obvious, suggested, or even implied by any of the prior art devices or methods, either alone or in any combination thereof.

According to an aspect of the present disclosure, one or more embodiments relate to a method and apparatus for determining/measuring differential pressure using at least two absolute pressure sensors/sensing cells, wherein each pressure sensor comprises a portion of a Wheatstone bridge and are connected in circuit with one another sharing common electronics. The pressure sensors are preferably provided in combination with a differential pressure element, such as a Venturi, wherein a first pressure sensor is located at a first position of the differential pressure element, and a second pressure sensor is located at a second position of the differential pressure element. In such aspect, the first and second pressure sensors preferably share the same power source. In a preferred embodiment, the method is preferably performed downhole and the differential pressure sensing apparatus is preferably provided as part of a downhole tool. In another preferred embodiment of the present aspect, the pressure sensors/sensing cells are manufactured using a silicon-on-insulator based technique.

In accordance with this aspect, it is an object of the present disclosure to provide a method and apparatus that is reliable, robust and highly resistant to pressure shocks or pressure fluctuations. In addition, it is an object of the present disclosure to provide a method and apparatus that minimizes/eliminates all common effects acting on each pressure sensor allowing the difference in pressure between the two absolute sensors to be obtained with a higher degree of resolution and accuracy than what can be obtained from conventional methods.

According to another aspect of the present disclosure, one or more embodiments relate to a method and apparatus for measuring flow rate of a fluid flowing through a wellbore. Such method and apparatus preferably comprises a differential pressure element disposed in a borehole, wherein the differential pressure element comprises a first pressure sensor located at a first position of the differential pressure element, and a second pressure sensor located at a second position of the differential pressure element. The flow rate is preferably determined by calculating a difference between the measurements of the first pressure sensor and the second pressure sensor.

In accordance with this aspect of the present disclosure, the first pressure sensor and the second pressure sensor preferably share the same power source and common electronics. Moreover, the first pressure sensor and the second pressure sensor each preferably comprise a strain gauge capable of measuring voltage in response to pressure acting at either the first location or second location. As such, the difference between the voltage output of the first pressure sensor and the second pressure sensor is preferably used in computing the flow rate of the fluid flowing through the wellbore.

In accordance with another aspect of the present disclosure, disclosed is a flow rate device for measuring the flow rate of a fluid flowing through a wellbore. The flow rate device comprises a differential pressure conduit locatable in the wellbore, defining an internal bore and is adapted to create a differential pressure. The differential pressure conduit also defining a first and a second pressure measuring stations axially spaced along the differential pressure conduit. The flow rate device also comprises a first pressure sensor positioned at the first pressure measuring station and having a first Wheatstone bridge adapted to generate a first pressure measurement signal indicative of a first pressure at the first pressure measuring station, and a second pressure sensor positioned at the second pressure measuring station and having a second Wheatstone bridge adapted to generate a second pressure measurement signal indicative of a second pressure at the second pressure measuring station. In yet another aspect of the flow rate device, the first Wheatstone bridge and the second Wheatstone bridge are homogeneous and have similar characteristics with respect to at least one of a temperature sensitivity, a pressure sensitivity, and a non-linearity, the similar characteristics are within a range of 0.01 percent to 10.0 percent.

In accordance with yet another aspect of the present disclosure, disclosed is a method for monitoring the flow rate of a fluid flowing through a wellbore. The method comprises the step of placing a differential pressure conduit in the wellbore, the differential pressure conduit defining an internal bore and adapted to create a differential pressure, the differential pressure conduit defining first and second pressure measuring stations axially spaced along the differential pressure conduit; measuring a first pressure at the first pressure measuring station using a first pressure sensor having a first Wheatstone bridge configured to include a first signal point and adapted to generate a first pressure measurement signal indicative of the first pressure measured by the first pressure sensor at the first signal point. The method also comprises the step of measuring a second pressure at the second pressure measuring station using a second pressure sensor having a second Wheatstone bridge configured to include a second signal point and adapted to generate a second pressure measurement signal indicative of the second pressure measured by the second pressure sensor at the second signal point. And lastly, the method comprises the step of calculating the flow rate of a fluid flowing through the differential pressure conduit by determining the pressure differential between the first and second pressure measuring stations based on the first pressure measurement signal taken from the first signal point and the second pressure measurement signal taken from the second signal point, wherein the first and second signal points are symmetrical with respect to the first and second Wheatstone bridges.

In yet another aspect of the present disclosure, disclosed is a system for determining pressure differences of a fluid flowing through a differential pressure conduit positioned in a wellbore. The system comprises a first pressure sensor positioned at a first pressure measuring station, the first pressure sensor having a first Wheatstone bridge adapted to generate a first pressure measurement signal indicative of a first pressure measured by the first pressure sensor at a first signal point. The system further comprises a second pressure sensor positioned at a second pressure measuring station, the second pressure sensor having a second Wheatstone bridge adapted to generate a second pressure measurement signal indicative of a second pressure measured by the second pressure sensor at a second signal point. In yet another aspect of the disclosed system, the calculation of the pressure differential between the first and second pressure measuring stations is based on the first pressure measurement signal taken from the first signal point and the second pressure measurement signal taken from the second signal point, wherein the first and second signal points are symmetrical with respect to the first and second Wheatstone bridges.

In yet another aspect of the present disclosure, disclosed is a method. The method comprises the step of placing, at a first pressure measuring station in a differential pressure conduit adapted to be positioned in a wellbore, a first pressure sensor having a first Wheatstone bridge adapted to generate a first pressure measurement signal indicative of a first pressure measured at the first pressure measuring station. The method also comprises the step of placing, at a second pressure measuring station in the differential pressure conduit, a second pressure sensor having a second Wheatstone bridge adapted to generate a second pressure measurement signal indicative of a second pressure measured at the second pressure measuring station, the differential pressure conduit defining an internal bore and adapted to create a differential pressure at the first and second pressure measuring stations, the first and second pressure measuring stations being axially spaced along the differential conduit. In yet another aspect of the method, the first Wheatstone bridge and the second Wheatstone bridge are homogeneous and have similar characteristics with respect to at least one of a temperature sensitivity, a pressure sensitivity, and a non-linearity, the similar characteristics being within a range of 0.01 percent to 10 percent.

These together with other aspects, features, and advantages of the present disclosure, along with the various features of novelty, which characterize the invention, are pointed out with particularity in the claims annexed to and forming a part of this disclosure. The above aspects and advantages are neither exhaustive nor individually or jointly critical to the spirit or practice of the disclosure. Other aspects, features, and advantages of the present disclosure will become readily apparent to those skilled in the art from the following detailed description in combination with the accompanying drawings. Accordingly, the drawings and description are to be regarded as illustrative in nature, and not restrictive.

BRIEF DESCRIPTION OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

FIG. 7 is a partial schematic diagram of an exemplary differential pressure measurement device constructed in accordance with one aspect of the present disclosure.

FIGS. 8A and 8B depict graphs showing the temperature sensitivity using the method and apparatus of FIG. 5.

DETAILED DESCRIPTION OF THE EXEMPLARY EMBODIMENTS

Specific embodiments of the present disclosure will now be described in detail with reference to the accompanying drawings. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

The terminology and phraseology used herein is solely used for descriptive purposes and should not be construed as limiting in scope. Language such as "including," "comprising," "having," "containing," "consisting of," or "involving," and variations thereof, is intended to be broad and encompass the subject matter listed thereafter, equivalents, and additional subject matter not recited. Also, use of the term "about," and variations thereof, is intended to be broad and to account for minor variations such as, for example, manufacturing tolerances and the like.

In one aspect, embodiments disclosed herein generally relate to the symmetry of two absolute pressure sensors based on an array of strain resistors arranged in a Wheatstone bridge configuration. Resistors connected into a bridge configuration are known in the art. In instances where the detection of small changes is required, utilization of a Wheatstone bridge is often preferred.

Figure 1:
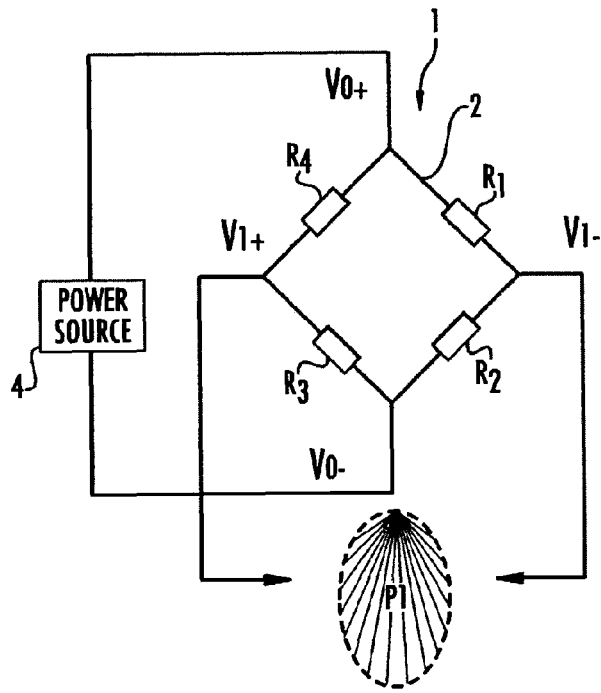
FIG. 1 depicts a conventional prior art strain sensor illustrating the Wheatstone bridge principle as is known in the art.

With reference now to FIG. 1, shown therein is a conventional strain sensor 1 for measuring pressure known in the art wherein the strain sensor 1 is comprised of four resistors R1, R2, R3, and R4 connected into a Wheatstone bridge configuration, i.e., a Wheatstone bridge circuit or simply a Wheatstone bridge, depicted by reference numeral 2. Broadly, the Wheatstone bridge 2 includes four nodes $V_{0+}$, $V_{0-}$, $V_{1+}$, and $V_{1-}$, wherein nodes $V_{0+}$ and $V_{0-}$ are used as the source and return nodes for a power supply 4 applied to the Wheatstone bridge 2. Nodes $V_{1+}$ and $V_{1-}$ can be used as measurement or output nodes of the Wheatstone bridge 2.

Figure 2:
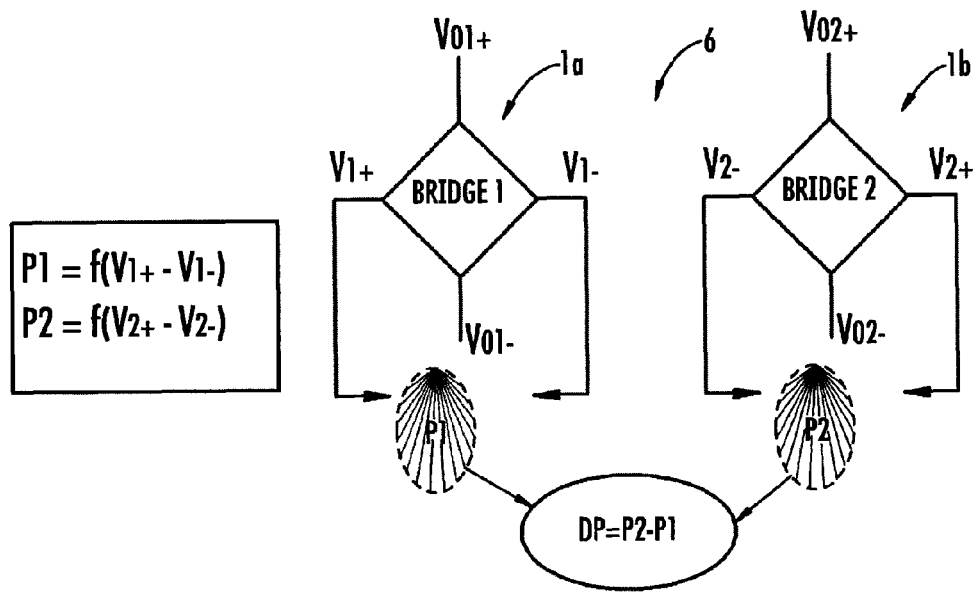
FIG. 2 depicts a prior art method for measuring differential pressure utilizing two Wheatstone bridges.

Shown in FIG. 2 is a prior art differential pressure measurement system 6. The differential pressure measurement system 6 includes two absolute strain sensors 1a and 1b which are similar to the strain sensor 1 shown in FIG. 1. As shown in accordance with the prior art method in FIG. 2, to measure a differential pressure, the two absolute strain sensors 1a and 1b have been used with each having a Wheatstone Bridge and the differential pressure is computed from the difference of the two absolute strain sensors 1a and 1b by taking the difference of their separate corresponding Wheatstone bridge outputs.

The present disclosure will hereafter be described in relation to a typical wellbore operation. However, it is to be understood that the present disclosure can also be used to measure a differential force in other applications.

Figure 3:
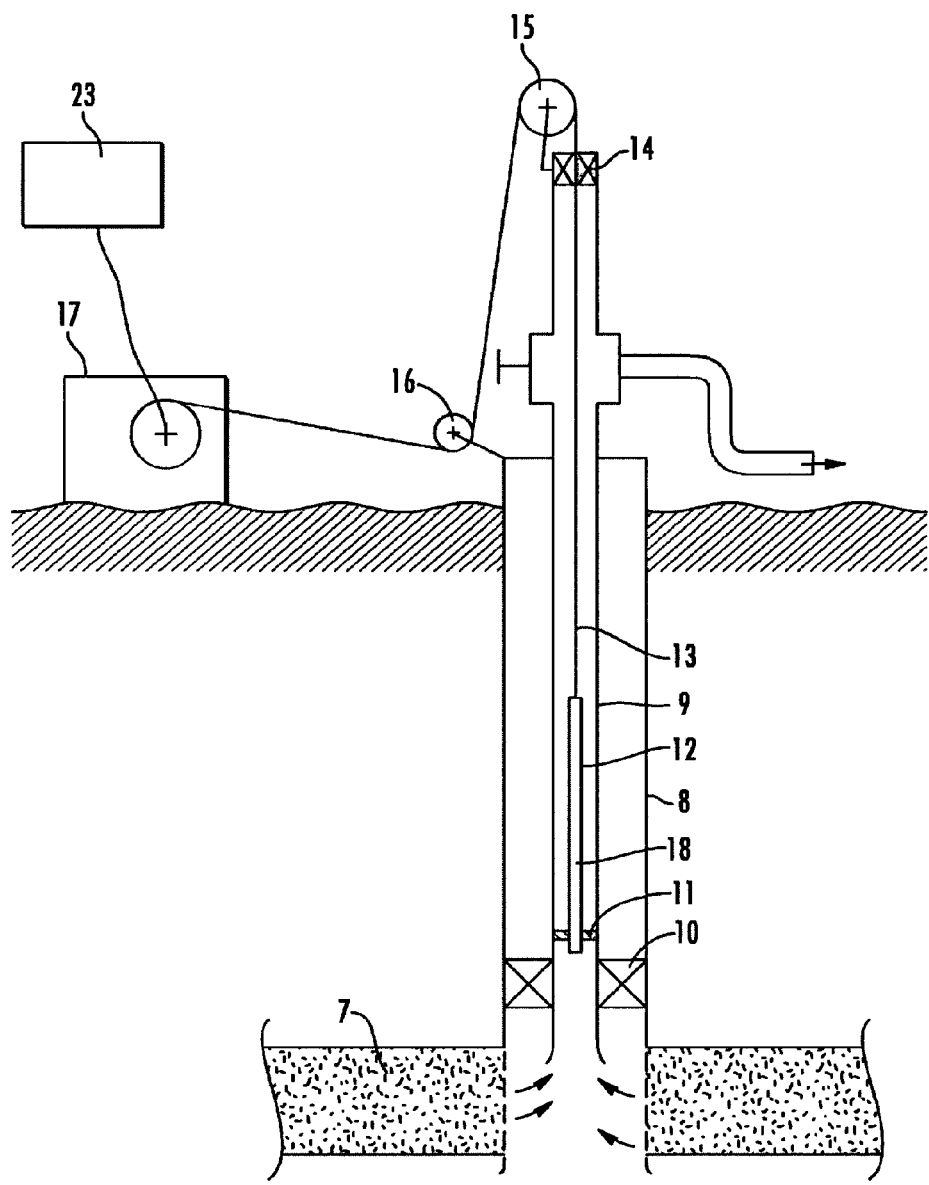
FIG. 3 depicts a flow rate device positioned in a hydrocarbon well in accordance with one version of the present disclosure.

Referring now to FIG. 3, shown therein is a well passing through an oil-producing zone 7 and comprising a casing 8 encompassing a production string 9. An annular sealing device 10 is located between about the bottom end of the casing 8 and the production string 9.

A downhole valve shown symbolically at 11 enables the production string 9 to be closed off at will at its bottom end. The downhole valve 11 can be an inflatable device, such as a packer, for example. A differential pressure conduit 12, which may be implemented in the form of a wireline or slickline device, is suspended from a cable 13 which emerges from the top of the production string 9 via a sealing device 14 and then passes via pulleys 15 and 16 prior to being wound onto the drum of a winch 17 disposed, for example, on the surface of the ground.

The differential pressure conduit 12 can be hollow and can also house measurement devices and electronic equipment associated therewith. In particular, the differential pressure conduit 12 has a section 18 located above the downhole valve 11 suitable for housing a differential pressure measurement device 22 (shown in FIG. 4) which is exposed to the pressure existing in the well below the valve 11 via one or more internal bore(s) passing through the differential pressure conduit 12.

In one aspect of the present disclosure, the cable 13 can be an electrical cable which, in addition to its mechanical function of suspending and actuating the device(s) housed by the differential pressure conduit 12, also conveys measurement signals to the surface, for example, the signals generated by the differential pressure measurement device 22 housed in said section 18. The signals may be completely or partially processed and restored by the electronic equipment housed in the differential pressure conduit 12, and/or on reaching the surface can be processed, stored, or displayed by means of a computing device 23, such as a computer system loaded with software for monitoring and tracking various downhole parameters, such as the flow rate of the fluid travelling within or through the well.

Figure 4:
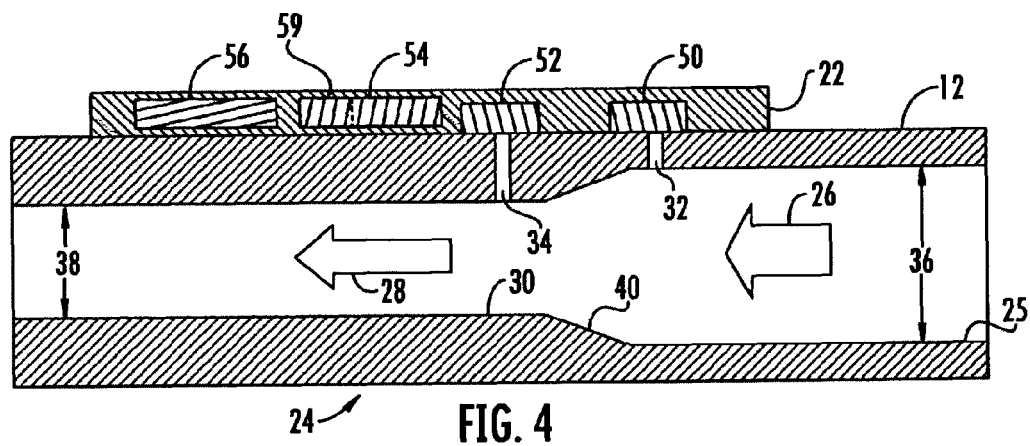
FIG. 4 is a cross-sectional view of an exemplary flow rate device constructed in accordance with one version of the present disclosure.

Referring now to FIG. 4, shown therein is a cross-sectional view of the section 18 of the differential pressure conduit 12 illustrating a flow rate device 24 constructed in accordance with the present disclosure for measuring a flow rate of a fluid flowing through or within a wellbore defined by the casing 8. In general, the flow rate device 24 is provided with the differential pressure conduit 12 and one or more differential pressure measurement devices 22. The differential pressure conduit 12 is locatable within the wellbore such that fluid flowing within the wellbore can flow through an internal bore 25 thereof in a direction depicted by arrows 26 and 28. The differential pressure conduit 12 is adapted to include at least one restriction 30, for example, to increase the velocity of fluid flowing through the differential pressure conduit 12 to create a differential pressure. The relationship between flow velocity and pressure can be described as a Venturi effect—which is known in the art. The differential pressure conduit 12 can be positioned near a reservoir, e.g., the oil producing zone 7, rather than at the surface, so that the flow rate device 24 can take flow rate measurements and disregard variables such as phase changes and gas expansion that occur as the well effluent travels across pressure and temperature differences between the reservoir and surface. The restriction 30 can also be formed with a flow restriction insert, as discussed in U.S. Ser. No. 12/715,478, filed on Mar. 2, 2010 and titled "Flow Restriction Insert for Differential Pressure Measurement."

Although the differential pressure conduit 12 is herein described as including or defining a restriction, it is to be understood that other configurations and/or methods for creating a differential pressure are known in the art, and such configurations are considered within the scope of the present disclosure. For example, the differential pressure conduit 12 can also be implemented as a dual venturi device or system, such as disclosed in U.S. Pat. No. 5,736,650, issued on Apr. 7, 1998 and titled "Venturi Flow Meter for Measurement in a Fluid Flow Passage."

The differential pressure conduit 12 defines a first pressure measuring station 32 and a second pressure measuring station 34 that are axially spaced along the differential pressure conduit 12. The first pressure measuring station 32 is in a portion of the differential pressure conduit 12 having a relatively constant first cross-sectional area 36, which is larger than a second cross-sectional area 38 of the restriction 30. The first cross-sectional area 36 and the second cross sectional area 38 are designated by arrows in FIG. 4. It should be understood that the first and second cross-sectional areas 36 and 38 can be provided with any suitable shape, such as circular, elliptical, square, rectangular, star shape, or the like. The restriction 30 can be formed in any suitable manner, such as by an inwardly tapering portion 40 of the differential pressure conduit 12 positioned between the first and second pressure measuring stations 32 and 34. Although the differential pressure conduit 12 is shown as a unitary element, it should be understood that the differential pressure conduit 12 can be implemented as two or more interconnected pieces.

The differential pressure measurement device 22 is provided with a first pressure sensor 50 positioned at the first pressure measuring station 32, a second pressure sensor 52 positioned at the second pressure measuring station 34, electronics 54 for operating and communicating with the first and second pressure sensors 50 and 52, and a power source 56, such as a battery or a device for converting movement into electrical power. The power source 56 supplies electrical power to the electronics 54 and the first and second pressure sensors 50 and 52. The electronics 54 is in electrical communication with the first and second pressure sensors 50 and 52 and includes circuitry, logic, and/or logic instructions adapted to communicate with the first and second pressure sensors 50 and 52 and receive therefrom a first pressure measurement signal indicative of a first pressure measured at the first pressure measuring station 32 and a second pressure measurement signal indicative of a second pressure measured the second pressure measuring station 34.

While the differential pressure measurement device 22 is herein described as having the first and second pressure sensors 50 and 52 positioned at the first and second pressure measuring stations 30 and 32, it is to be understood that the differential pressure conduit 12 can be constructed so as to define additional pressure measuring stations. In this instance, the differential pressure measuring device 22 can include additional pressure sensors, beyond the first and second pressure sensors 50 and 52 described herein.

The electronics 54 preferably also includes a processing unit 59 programmed with computer executable instructions stored on one or more computer readable medium (i.e., a memory, disk, or the like). The computer executable instructions, when executed by the processing unit 59, cause the processing unit 59 to process and analyze the first and second pressure measurement signals received from the first and second pressure sensors 50 and 52, as well as other data such as a density of the fluid, to calculate, or determine a flow rate of the fluid. Techniques for calculating the flow rate of the fluid using the density of the fluid and a differential pressure measurement are known in the art. See for example, U.S. Pat. No. 4,757,709, or U.S. Pat. No. 5,736,650. The data received from the first and second pressure sensors 50 and 52 and/or the data indicative of the flow rate of the fluid can be stored on one or more computer readable mediums, stored downhole for retrieval at surface, or may be sent to surface in real-time, or near real-time. Additionally, the data received from the first and second pressure sensors 50 and 52 can be communicated to a separate device or processing system, such as the computing device 23, for calculating the flow rate of the fluid. In this regard, it should be understood that the electronics 54 is also preferably provided with a communication device (not shown) for communicating with the computing device 23 via the cable 13, for example.

Figure 5:
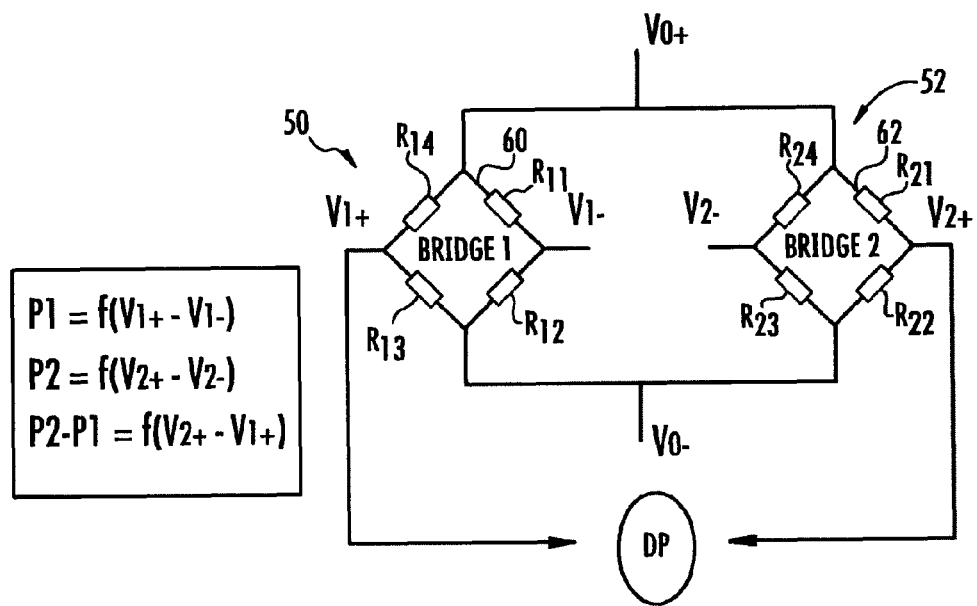
FIG. 5 depicts a method and apparatus for measuring differential pressure utilizing two symmetrical Wheatstone bridges in accordance with one aspect of the present disclosure.

With reference now to FIG. 5, shown therein is a schematic view of a preferred embodiment of the first and second pressure sensors 50 and 52 forming a portion of the differential pressure measurement device 22. In the preferred embodiment, the first pressure sensor 50 includes a first Wheatstone bridge 60 and second pressure sensor 52 includes a second Wheatstone bridge 62. The first Wheatstone bridge 60 is comprised of four resistors R11, R12, R13, and R14. The second Wheatstone bridge is comprised of four resistors R21, R22, R23, and R24. In a preferred embodiment, the resistors, or at least one of the resistors, forming the first and second Wheatstone bridges 60 and 62 are embodied as strain resistors, sensing elements, or strain gauge resistors, which are generally understood to be a type of resistor that changes value with applied strain or force, such as pressure. In accordance with the present disclosure, the first Wheatstone bridge 60 includes a first signal point which can be, for example, the signal taken or read from the node $V_{1+}$ or, alternatively, $V_{1-}$. The first signal point is the location wherein the first pressure measurement signal can be taken from. Similarly, the second Wheatstone bridge 62 includes a second signal point which can be, for example, the signal taken or read from the node $V_{2+}$ or, alternatively, $V_{2-}$. The second signal point is the location wherein the second pressure measurement signal can be taken from.

In accordance with the preferred embodiment shown in FIG. 5, the differential pressure between the first and second pressure sensors 50 and 52 is determined based on the first pressure measurement signal taken or read from the first signal point and the second pressure measurement signal taken or read from the second signal point. That is, in one embodiment, the instant disclosure does not determine the pressure at the first pressure measuring station 32 from the first pressure sensor 50 as a function of the first Wheatstone bridge 60 being unbalanced, and therefore reading a difference of potential between nodes $V_{1+}$ and $V_{1-}$ and determining the pressure at the second pressure measuring station 34 from the second pressure sensor 52 as a function of the second Wheatstone bridge 62 being unbalanced, and therefore reading a difference of potential between nodes $V_{2+}$ and $V_{2-}$. Instead, the presently described disclosure can determine the pressure differential between the first and second pressure measuring stations 32 and 34 by taking or reading the first pressure measurement signal from the first signal point of the first Wheatstone bridge 60 and the second pressure measurement signal from the second signal point of the second Wheatstone bridge 62. In one example, the first signal point is selected as node $V_{1+}$ of the first Wheatstone bridge 60 and the second signal point is selected as node $V_{2+}$ of the second Wheatstone bridge 62. In this example, the differential pressure is determined based on the first pressure measurement signal taken or read from $V_{1+}$ and the second pressure measurement signal taken or read from $V_{2+}$. In another example, the first signal point is selected as node $V_{1-}$ and the second signal point is selected as $V_{2-}$. In this example, the differential pressure is determined based on the first pressure measurement signal taken or read from $V_{1-}$ and the second pressure measurement signal taken or read from $V_{2-}$. As can be seen, the selected first and second signal points are symmetrical with each other with respect to the first and second Wheatstone bridges 60 and 62.

In the preferred embodiment, the first and second signal points are symmetrical with respect to the first and second Wheatstone bridges 60 and 62. That is, when the first signal point from the first Wheatstone bridge 60 is selected to be the node $V_{1+}$, then preferably the second signal point from the second Wheatstone bridge 62 would then be selected to be from the node $V_{2+}$. Similarly, when the first signal point from the first Wheatstone bridge 60 is selected to be the node $V_{1-}$, then preferably the second signal point from the second Wheatstone bridge 62 is selected to be from the node $V_{2-}$.

Generally, when there is no pressure on the first pressure sensor 50, the output of the first Wheatstone bridge 60, i.e., the difference of potential between nodes $V_{1+}$ and $V_{1-}$, is nearly equal to zero. When pressure is applied to the first pressure sensor 50, the first Wheatstone bridge 60 becomes unbalanced and $V_{1+}$ increases while $V_{1-}$ decreases. The output of the first Wheatstone bridge 60 is a function of the pressure at the first pressure measuring station 32, as measured by the first pressure sensor 50. Since the second Wheatstone bridge 62 is configured substantially identical to the first Wheatstone bridge 60, the same behavior occurs, i.e., $V_{2+}$ increases while $V_{2-}$ decreases when pressure is applied to the second pressure measuring station 34. When the output of the first Wheatstone bridge 60 is the same as the output of the second Wheatstone bridge 62, the differential pressure is equal to zero and correspondingly, $V_{1+}$ is equal to $V_{2+}$. If the output of the first Wheatstone bridge 60 is not equal to the output of the second Wheatstone bridge 62, the difference between $V_{1+}$ and $V_{2+}$ will be a function of the differential pressure. That is, as discussed herein with regards to the first and second pressure measurement signals taken from the first and second signal points, it is to be understood that said signals are a function of, or are otherwise indicative of the first and second pressures being measured at the first and second pressure measuring stations 32 and 34. Based on the first and second pressure measurement signals, this permits a determination of the flow rate of the fluid flowing through the differential pressure measuring conduit 12.

As would be understood, both the first and second pressure sensors 50 and 52 including the first and second Wheatstone bridges 60 and 62, respectively, will vary in the same manner when exposed to the same common mode effects (i.e., absolute pressure, temperature, time response, and the like). This means that the differential pressure measurement taken as described above from the first and second signal points will only be sensitive to the differential pressure between the pressure measuring stations 32 and 34, as measured by the first and second pressure sensors 50 and 52. This results in a more accurate differential pressure measurement device 22 that is capable of operating in the harsh environment typically found downhole in a wellbore operation while also providing the sensitivity to detect relatively small differences in pressure, as is described in more detail below.

In yet another aspect of the present disclosure, the first and second Wheatstone bridges 60 and 62 as well as the first and second pressure sensors 50 and 52 are manufactured using silicon-on-insulator (SOI) technology, as used in semiconductor manufacturing and microelectronics, e.g., MEMS technology (Miniaturized Electrical and Mechanical Systems). SOI-based devices provide numerous advantages for improved performance whereby the micro-electronically manufactured elements of a Wheatstone bridge can be selected so that their behavior is well matched. As such, the elements forming the first and second Wheatstone bridges 60 and 62 as well as the first and second pressure sensors 50 and 52 can be chosen so as to minimize any additional errors/effects resulting from manufacturing, elemental properties, parasitic effects, drift, transient effects, or the like. It should be understood that aspects of the present invention are not limited to SOI-based technology, and for exemplary purposes may include silicon-on-dioxide, sapphire, and others.

That is, in yet another aspect of the present disclosure, the first and second Wheatstone bridges 60 and 62 are formed using SoI materials or techniques. SoI is understood in the art and generally refers to the formation of a layered material having a silicon-insulator-silicon structure. Further, utilization of SoI materials permits the size of the sensing elements or absolute pressure sensors forming the first and second Wheatstone bridges 60 and 62 to be substantially smaller than the sensing elements used in currently existing absolute pressure sensors. In a preferred embodiment of the present disclosure, the absolute pressure sensors or sensing elements forming the first and second Wheatstone bridges 60 and 62 are sized within a range of about 0.1 millimeter to about 2.0 centimeters. In an even more preferred embodiment, the absolute pressure sensors or sensing elements forming the first and second Wheatstone bridges 60 and 62 are sized within a range of about 1.0 to 3.0 millimeters. In one aspect of the present disclosure, the smaller size of SoI based absolute pressure sensors or sensing elements forming the first and second Wheatstone bridges 60 and 62 results in a substantial increase in sensitivity and accuracy over existing pressure sensors and yet maintains resiliency required by pressure sensors used in a downhole wellbore operation.

In another aspect of the present disclosure, the absolute pressure sensors or sensing elements forming the first and second Wheatstone bridges 60 and 62 are selected so as to be ideally matched, e.g., homogeneous. That is, in a preferred embodiment of the present disclosure, the first and second Wheatstone bridges 60 and 62 are selected based on their characteristics. The characteristics of the first and second Wheatstone bridges 60 and 62 generally refer to a temperature sensitivity, a pressure sensitivity, a non-linearity, an impedance value, and the like. In one example, the absolute pressure sensors or sensing elements forming the first and second Wheatstone bridges 60 and 62 are selected from the same wafer or sheet of SoI material.

That is, SoI materials are generally manufactured in a wafer or sheet form wherein individual elements are then cut, stamped, or otherwise taken from the sheet or wafer of SoI material. In accordance with the present disclosure, the first and second Wheatstone bridges 60 and 62 can be chosen or selected from a single sheet or wafer of SoI material. Selection of the absolute pressure sensors or sensing elements forming the first and second Wheatstone bridges 60 and 62 provides improved characteristic matching between the first Wheatstone bridge 60 and the second Wheatstone bridge 62 (see FIGS. 14A and 14B, 15A and 15B, and 16A and 16B discussed below for examples). In one aspect, the characteristics of the first and second Wheatstone bridges 60 and 62 are within a range of about 0.01 percent to about 10 percent. In yet another aspect, the characteristics of the first and second Wheatstone bridges 60 and 62 are within a range of about 0.01 to about 2 percent. In yet another aspect of the present disclosure, the characteristics of the first and second Wheatstone bridges 60 and 62 are within a range between about 0.01 percent to about 1 percent. In an even further aspect of the present disclosure, the characteristics of the first and second Wheatstone bridges 60 and 62 are within a range between about 0.5 percent to about 1 percent.

In yet another aspect of the present disclosure, the differential pressure measurement device 22 can be constructed using the following steps. In a preferred embodiment, many Wheatstone bridges are formed in the sheet or wafer of SoI material utilizing various fabrication techniques, such as cutting, etching or stamping. The absolute pressure sensors or sensing elements forming the first and second Wheatstone bridges 60 and 62 are selected from the same sheet or wafer of SoI materials. As discussed above, this provides improved characteristic matching.

Next, the absolute pressure sensors or sensing elements forming the Wheatstone bridges are verified or tested to confirm the homogeneous nature. In this step, the Wheatstone bridges on the sheet or wafer of SoI material are individually tested and then the test results are compared to confirm similar characteristics, e.g., temperature sensitivity, pressure sensitivity, non-linearity, and the like to determine closest matched Wheatstone bridges.

Next, the closest matched Wheatstone bridges are removed from the sheet or wafer of SoI material and packaged or assembled as actual pressure sensors including all of the associated electronics and/or circuitry, e.g., electronics 54. Once assembled, the pressure sensors are calibrated to confirm the characteristics of the pressure sensor, e.g., temperature and pressure sensitivity. The pressure sensors are also calibrated to determine operation within the electronics/circuitry. For example, the pressure sensors are calibrated to determine impedance and the like.

Next, the pressure sensors having the most closely matched or similar characteristics and/or performance are selected to form the first and second Wheatstone bridges 60 and 62 of the first and second pressure sensors 50 and 52.

Then, the first and second pressure sensors 50 and 52 are repackaged into the differential pressure measuring device 22, including the associated components. Again, the first and second pressure sensors 50 and 52 are then recalibrated so as to confirm or verify characteristic similarity and operational performance.

The above-described process results in the first and second pressure sensors 50 and 52 including the first and second Wheatstone bridges 60 and 62, respectively, wherein each pressure sensor exhibits substantially similar sensitivities to such things as temperature, pressure, and non-linearity, circuitry operation, and the like.

Figure 6:
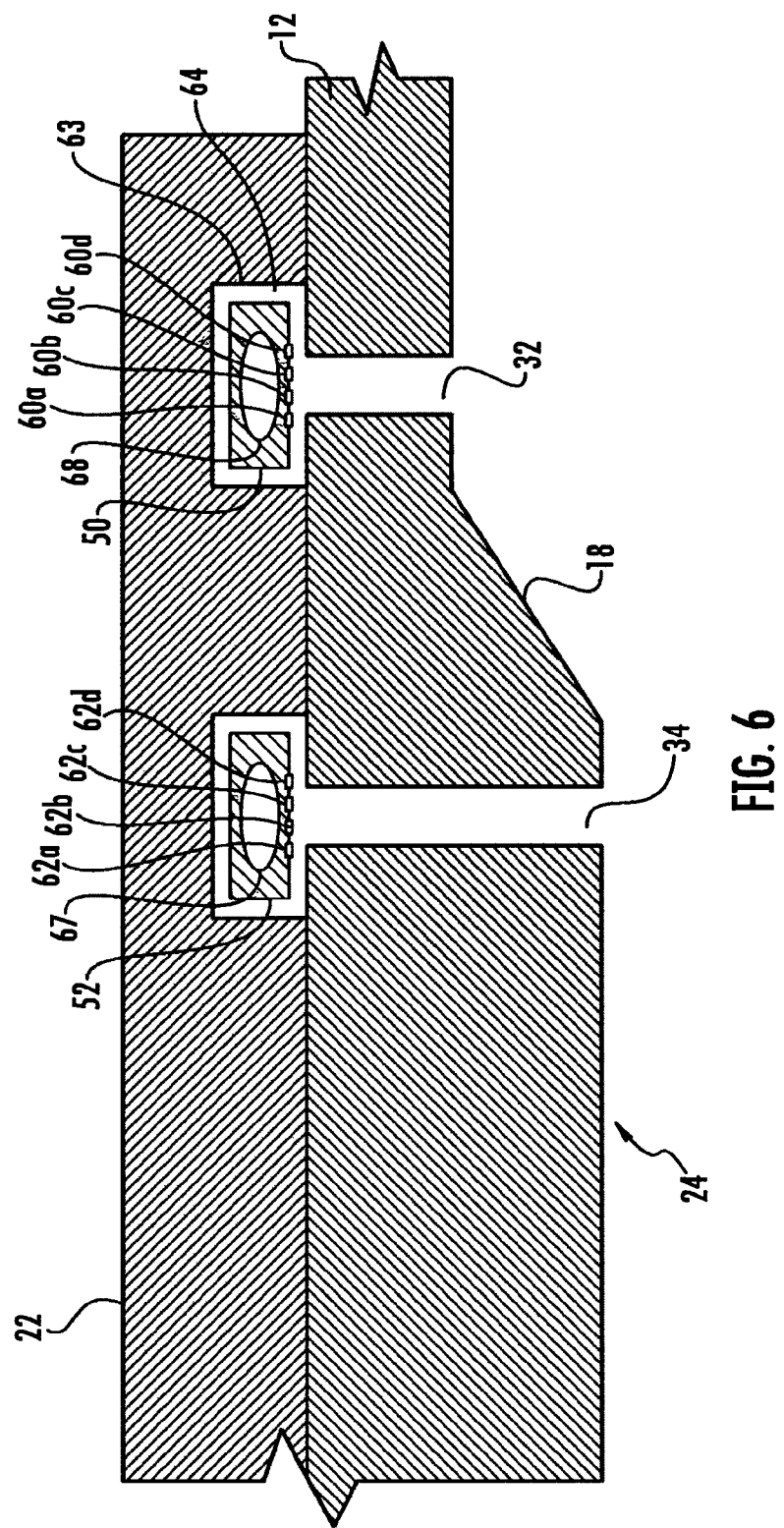
FIG. 6 is an enlarged, more detailed view of a portion of the cross-sectional view of the exemplary flow rate device shown in FIG. 4.

With more particular attention now to the embodiment wherein the first and second pressure sensors 50 and 52 are positioned at the first and second pressure measuring stations 32 and 34, one example of such a configuration is shown in FIG. 6. While the below discussion provides an example of an embodiment implementing the first pressure measuring station 32 and the first pressure sensor 50, the second pressure measuring station 34 and the second pressure sensor 52 operates similarly and will therefore not be described separately.

In particular, FIG. 6 shows an enlarged view of a portion of the cross-sectional view of the section 18 of the differential pressure conduit 12 illustrating the flow rate device 24. In the embodiment shown in FIG. 6, the first pressure measuring station 32 includes a cavity wall 63 that defines a cavity 64. The first pressure sensor 50 is positioned in or otherwise placed in the cavity 64 of the first pressure measuring station 32. In the example shown in FIG. 6, the first pressure sensor 50 includes a central cavity 68 filled with, for example, a vacuum or with a silicon material. The absolute pressure sensors or sensing elements forming the first Wheatstone bridge 60 of the first pressure sensor 50 are illustrated in FIG. 6 and identified by reference numerals 60a, 60b, 60c, and 60d. With regards to the second pressure sensor 52, the second pressure sensor 52 includes a central cavity 67 similar to the central cavity 68. The absolute pressure sensors or sensing elements forming the second Wheatstone bridge 62 of the second pressure sensor 52 are illustrated in FIG. 6 and identified by reference numerals 62a, 62b, 62c, and 62d.

Techniques for placing a pressure sensor within a cavity so as to sense the pressure within the cavity are known in the art and such techniques are considered within the scope of the present disclosure. In one example, the first pressure sensor 50 can be attached or otherwise positioned within the cavity 64 of the first pressure measuring station 32 via a miniaturized shell, such as the shell described in EP 1 783 475 A1, published Sep. 5, 2007.

Referring now to FIG. 7, shown therein is a block diagram of one embodiment of the differential pressure measurement device 22 constructed in accordance with the present disclosure. As shown in FIG. 7 and discussed above, the differential pressure measurement device 22 includes the power source 56, the electronics 54, the first and second pressure sensors 50 and 52 including the first and second Wheatstone bridges 60 and 62, respectively. The electronics 54 also includes the processing unit 59, as described above, as well as a memory 72, an oscillator 74, an analog/digital voltage regulator 76, and an analog-to-digital converter (ADC) 78. The first and second pressure sensors 50 and 52 including the first and second Wheatstone bridges 60 and 62, as well as the processing unit 59 function substantially as described herein.

Although the memory 72 and the oscillator 74 are shown as being distinct from the processing unit 59, it is to be understood that they can also be formed as a part of the processing unit 59. That is, many common processors are constructed to include memory and/or oscillator functionalities. These processors are considered to be within the scope of the present disclosure. The memory 72 can be formed of a variety of different types of memory units, for example, solid state and the like, which communicates with the processing unit 59 to store data or signals. For example, the memory 72 can be used to store the first and second pressure measurement signals discussed above. Also, the processing unit 59 can also include logic or instructions, as is described above, wherein the processor calculates the differential pressure measurement and then stores the resulting data in the memory 72.

The oscillator 74 functions so as to create a clock function or to create a signal having a determinable frequency usable by the processing unit 59. Methods and circuits capable of generating an oscillator 74 are well known in the art, and the oscillator 74 can be implemented using such techniques.

The analog/digital voltage regulator 76 is in communication with the power source 56 and is adapted to receive a voltage signal from the power source 56 and thereby regulate the voltage signal to provide an operating voltage to the differential pressure measurement device 22. Although the electronics 54 is shown in FIG. 7 as having one analog/digital voltage regulator 76 adapted to provide a regulated voltage to the device 22, e.g., the first and second pressure sensors 50 and 52, it is to be understood that the electronics 54 can include two (2), or a first and a second analog/digital voltage regulators 76 wherein each regulator 76 provides a separate regulated operating voltage to the first and second pressure sensors 50 and 52. For example, in this embodiment, the first voltage regulator 76 can supply the operating voltage to the first pressure sensor 50 and the second voltage regulator 76 can supply the operating voltage to the second pressure sensor 52. In one aspect of the present disclosure, the analog/digital voltage regulator 76, implemented as a single regulator or as two regulators, is adapted to receive a voltage signal from the common power source 56.

The ADC 78 includes circuitry and/or logic adapted to receive an analog signal and, in response, to generate a digital signal indicative of the analog signal. In a preferred embodiment, the ADC 78 is directly connected to or in electrical communication with the first and second pressure sensors 50 and 52 to thereby receive the first and second pressure measurement signals. In response, the ADC 78 is adapted to generate or output two digital signals indicative of the first and second pressure measurement signals. In another embodiment, the electronics 54 can include two (2), or a first and a second ADC 78. In this embodiment, the first ADC 78 can be connected to or in communication with the first pressure sensor 50 and the second ADC 78 can be connected to or in communication with the second pressure sensor 52. The processing unit 59 includes circuitry and/or logic adapted to receive the output of the ADC 78, i.e., the digital signals indicative of the first and second pressure measurement signals.

Further, although the ADC 78 is shown as a separate component of the electronics 54, it is to be understood that the processing unit 59 can also be implemented to perform the functionality of the ADC 78, and also the configuration having two (2) ADC 78. That is, processors, microprocessors, microcontrollers, and the like, capable of implementing the processing unit 59 generally include ADC capabilities.

FIG. 7 also shows temperature sensors 80 and 82 and amplifier elements 84 and 86. Temperature sensors 80 and 82 are adapted to sense the temperature at the first and second pressure sensors 50 and 52, respectively, and generate a temperature signal indicative thereof. Amplifier elements 84 and 86 are adapted to amplify the first and second pressure measurement signals from the first and second pressure sensors 50 and 52, respectively. Methods of implementing temperature sensors 80 and 82 and amplifiers 84 and 86 are known in the art and are considered within the scope of the present disclosure.

Referring now to FIGS. 8A and 8B, shown therein are two graphs comparing the temperature sensitivity between conventional methods (FIG. 8A) and the temperature sensitivity of the differential pressure measurement mode obtained using the presently described concepts (FIG. 8B). As can be seen, the graphs show that the temperature sensitivity of the differential pressure measurement obtained from the presently described concepts can be reduced by a factor of fifty when compared to conventional methods.

Figure 9:
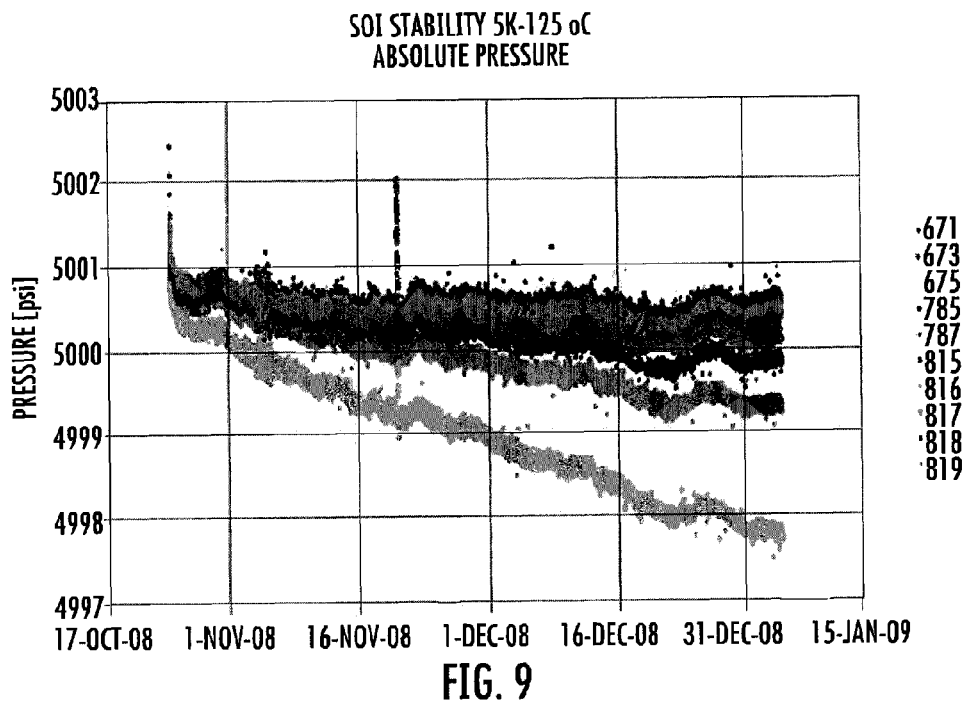
FIG. 9 illustrates experimental results of a long term stability comparison of a variety of absolute sensor elements in accordance with an aspect of the present disclosure.
Figure 10:
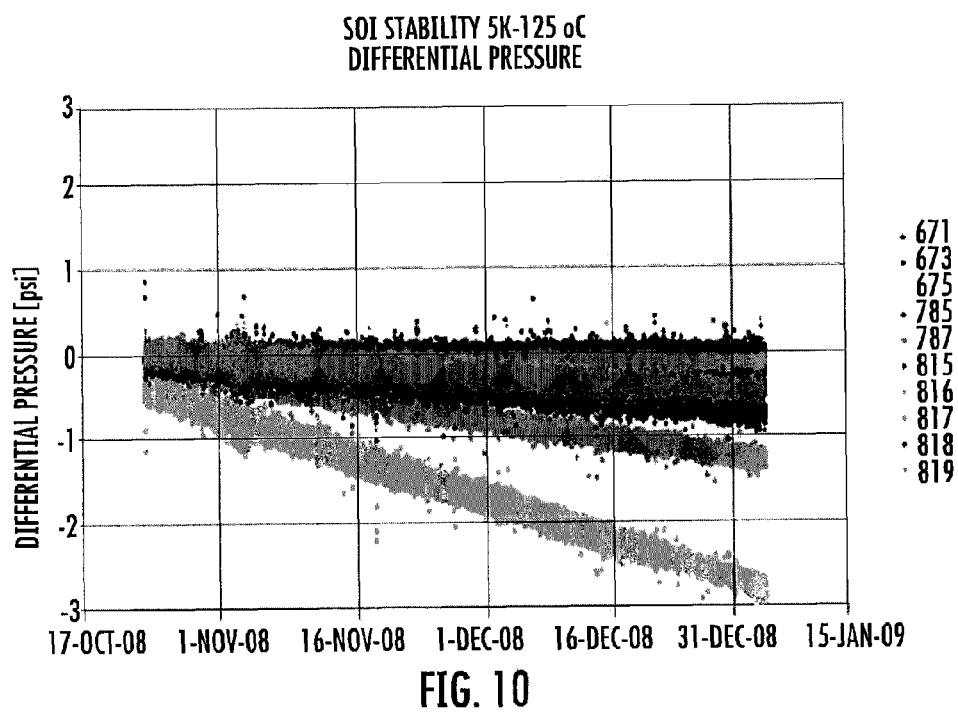
FIG. 10 also illustrates experimental results of a long term stability comparison of a variety of differential sensor elements in accordance with an aspect of the present disclosure.

Referring now to FIGS. 9 and 10, shown therein are graphs comparing the elastic and drift effects of the conventional methods (FIG. 9) with the differential pressure measurement mode obtained using the presently described concepts. The graphs shown in FIGS. 9 and 10 demonstrate that inelastic effects (response to pressure shock in the beginning of the experiment) are suppressed and that the drift can be significantly reduced using the presently described concepts.

Figure 11:
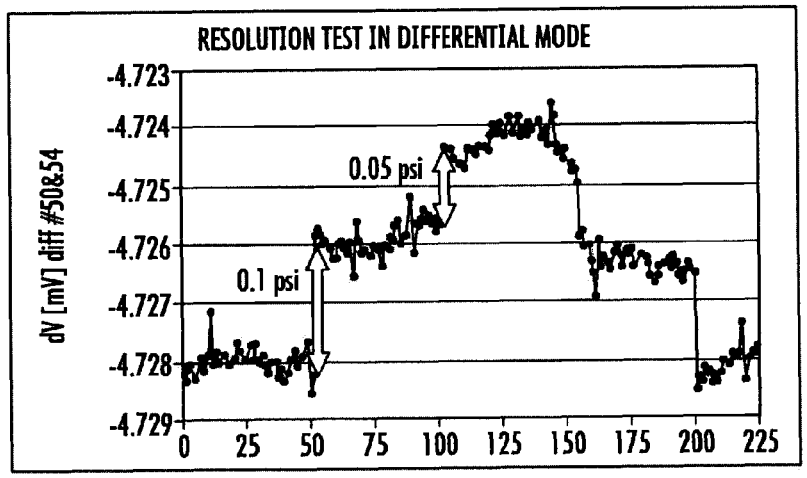
FIG. 11 illustrates experimental results of voltage measurements in accordance with an aspect of the present disclosure.

Referring now to FIG. 11, shown therein is a graph demonstrating the resolution of the differential pressure measurement device 22 constructed in accordance with the presently described concepts. As shown therein, a signal indicative of a pressure reading less than 0.05 psi can be detected with the presently described system. For example, in a first case, where $(V_{1+}-V_{1-})$ is used, the presently described system measures a small change on a small voltage difference. However, in a second case, where two absolute pressure bridges are used, each pressure bridge electronics needs to resolve a small change around a large voltage output due to the absolute pressure.

Figure 12A:
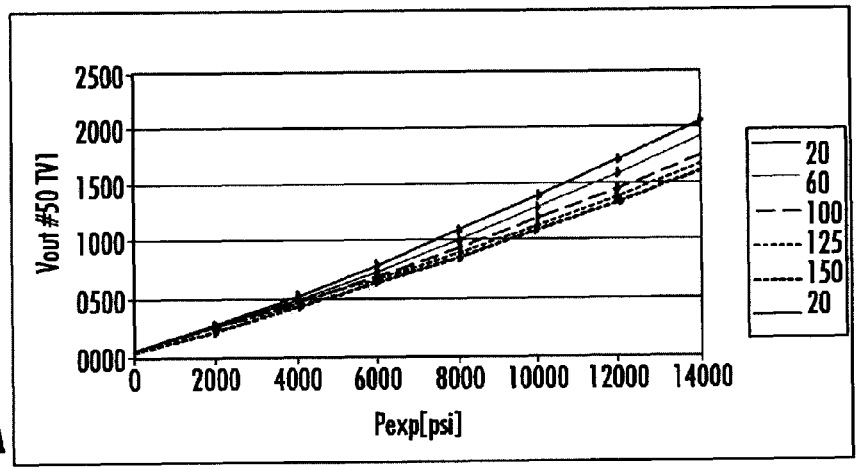
FIGS. 12A-12D depict graphs which illustrate experimental results of temperature and pressure sensitivities in accordance with an aspect of the present disclosure.
Figure 12B:
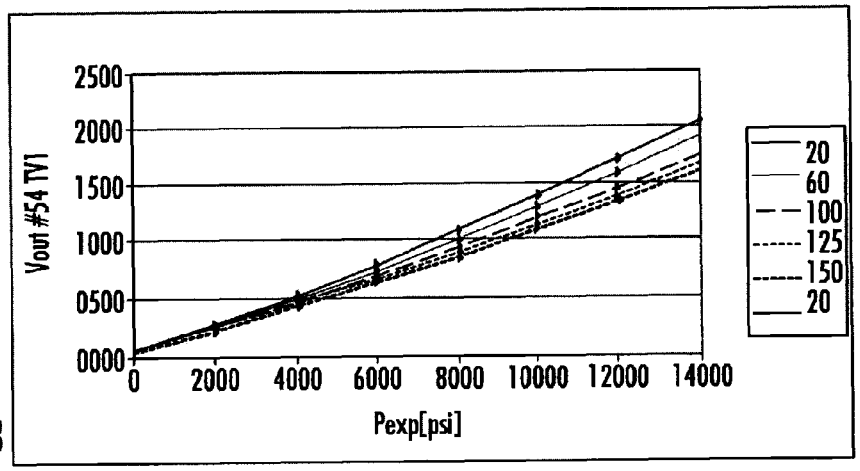
Figure 12C:
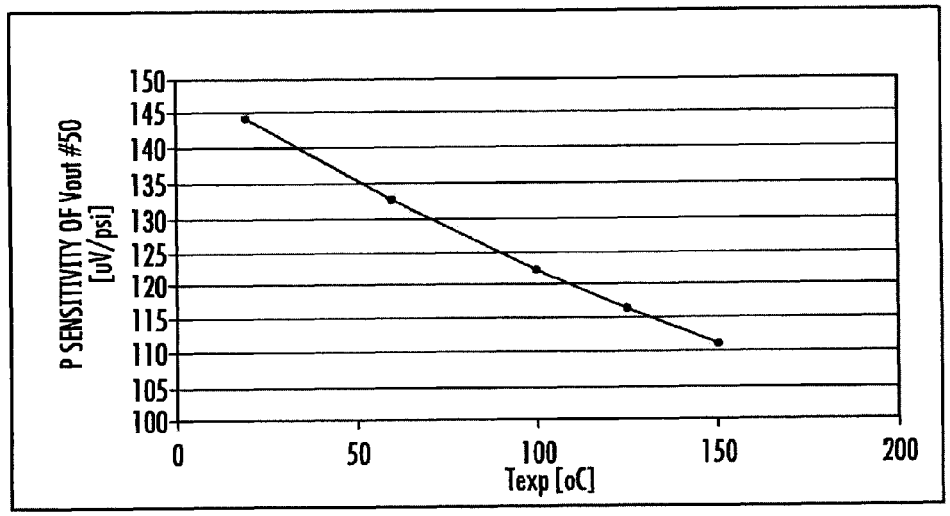
Figure 12D:
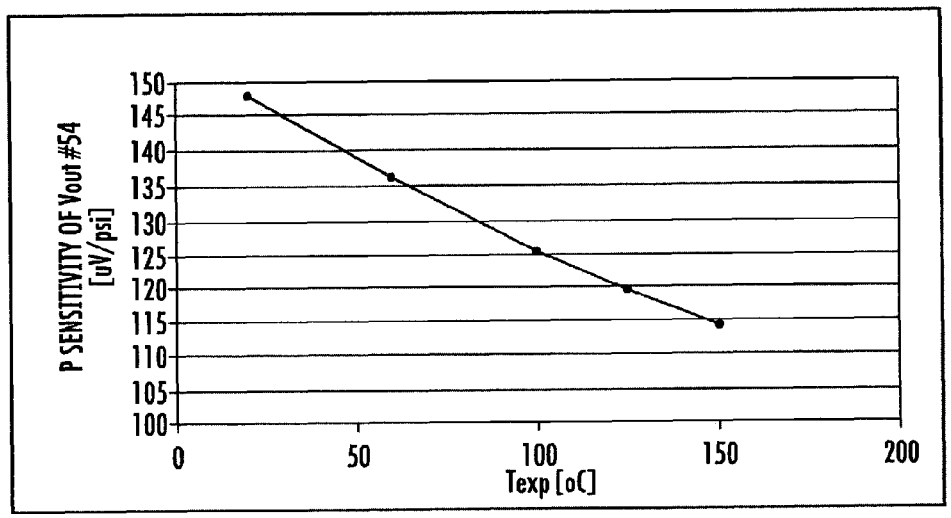

Referring now to FIGS. 12A-12D, shown therein is an illustration of the similarities of the pressure and temperature sensitivities (e.g., characteristics) using an embodiment of the presently described systems. FIGS. 12A and 12B illustrate the corresponding sensitivity of the first and second Wheatstone bridges 60 and 62 as a function of pressure for various temperatures, in degrees Celsius. In particular, FIGS. 12A and 12B show one example of the sensitivities of the first and second pressure sensors 50 and 52 including the first and second Wheatstone bridges 60 and 62 as a function of pressure. Similarly, FIGS. 12C and 12D illustrate the sensitivity as a function of temperature. As can be seen, the temperature sensitivity of each of the first and second Wheatstone bridges 60 and 62 is substantially similar, which provides one example of the improved cancellation of common mode effects discussed above using the presently disclosed concepts.

Figure 13A:
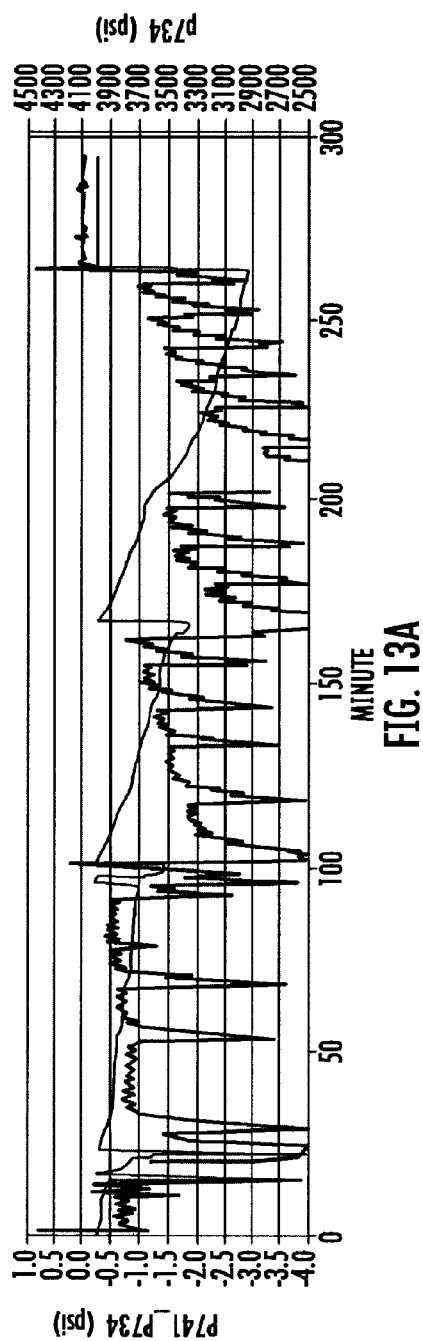
FIGS. 13A and 13B depict graphs which illustrate a differential pressure response during large pressure shocks using differing pairs of absolute sensors in accordance with an aspect of the present disclosure.
Figure 13B:
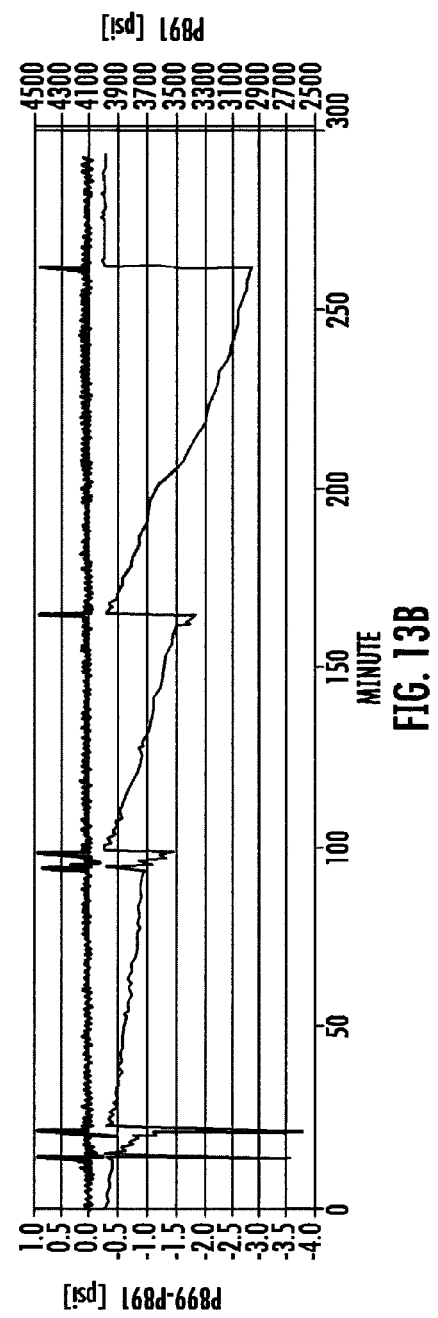

FIGS. 13A and 13B illustrate a differential pressure response during large pressure shocks, comparing conventional Quartz based sensors (FIG. 13A) with SOI-based sensors (FIG. 13B) utilized with the presently disclosed concepts. In particular, in accordance with an object of the present disclosure, the dynamic effects are predominantly cancelled for the SOI-based sensors of the presently disclosed concepts during large pressure shocks. As shown in FIGS. 13A and 13B, the Quartz and SOI based sensors are exposed to a relatively large pressure drop, and the differential response from each pair of sensors is plotted.

Figure 14A:
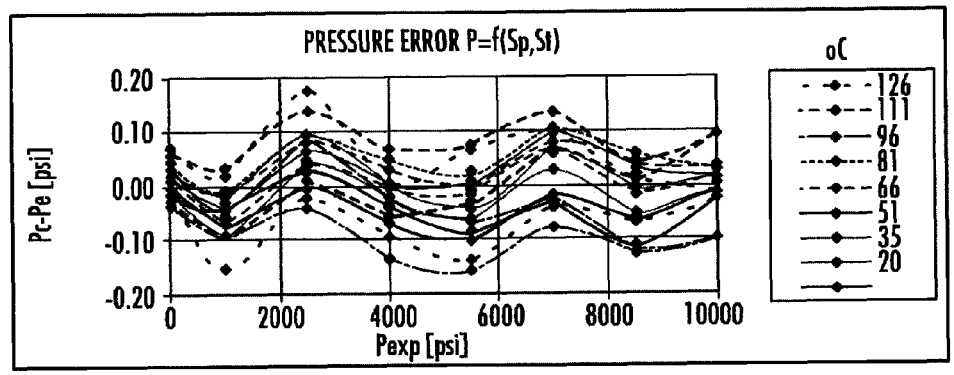
FIGS. 14A and 14B depict graphs which illustrate calibration error comparisons for a first pressure sensor and a second pressure sensor in accordance with an aspect of the present disclosure.
Figure 14B:
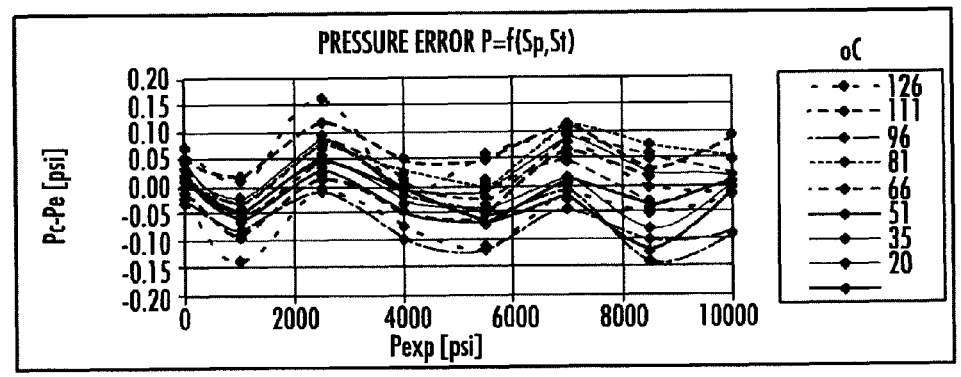

Referring now to FIGS. 14A and 14B, shown therein are graphs which illustrate calibration error comparisons for a first pressure sensor 50 and a second pressure sensor 52, wherein the calibration error of the first pressure sensor 50 is shown in FIG. 14A and the calibration error of the second pressure sensor 52 is shown in FIG. 14B, in accordance with an aspect of the present disclosure. In particular, the graphs show the similarity in the characteristics resulting from the particular selection process of the first and second pressure sensors 50 and 52 in accordance with the present disclosure. The x-axis shows the pressure given in psi. The y-axis shows the PC (computed pressure) and PE (experimental pressure) as a function of calibration error.

Figure 15A:
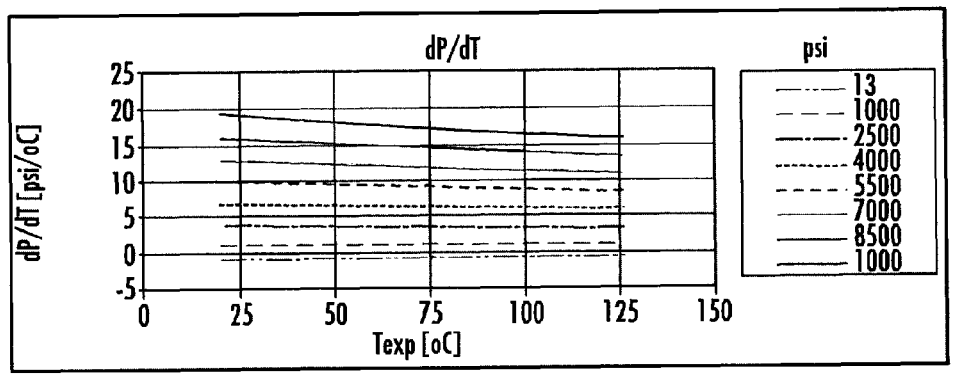
FIGS. 15A and 15B depict graphs which illustrate temperature sensitivity and pressure sensitivity comparisons for the first and second pressure sensors in accordance with an aspect of the present disclosure.
Figure 15B:
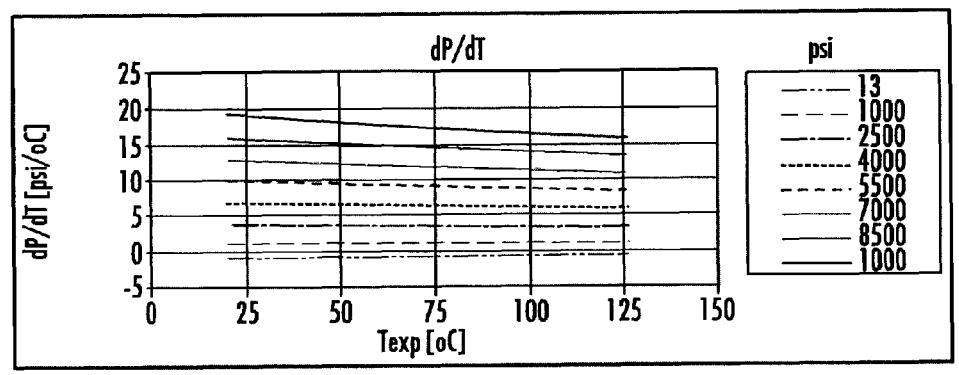

Referring now to FIGS. 15A and 15B, shown therein are graphs which illustrate temperature sensitivity and pressure sensitivity comparisons for the first and second pressure sensors 50 and 52, wherein the temperature and pressure sensitivity of the first pressure sensor 50 is shown in FIG. 15A and the temperature and pressure sensitivity of the second pressure sensor 52 is shown in FIG. 15B, in accordance with an aspect of the present disclosure. In particular, the graphs show a combination of temperature and pressure sensitivities.

Figure 16A:
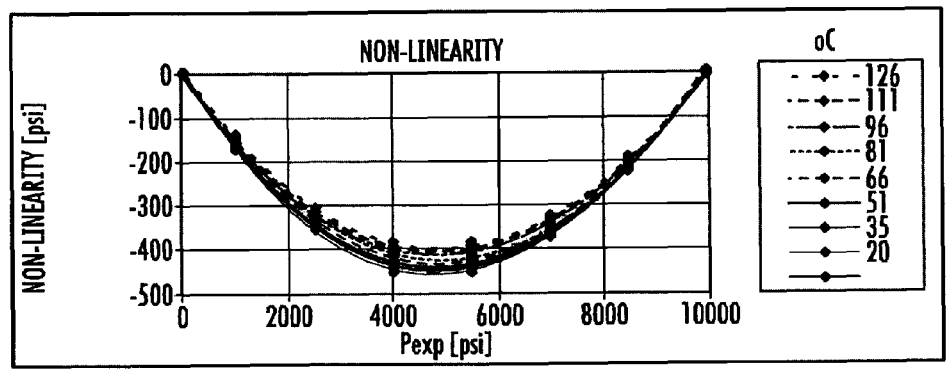
FIGS. 16A and 16B depict graphs which illustrate non-linearity comparisons for the first and second pressure sensors in accordance with an aspect of the present disclosure.
Figure 16B:
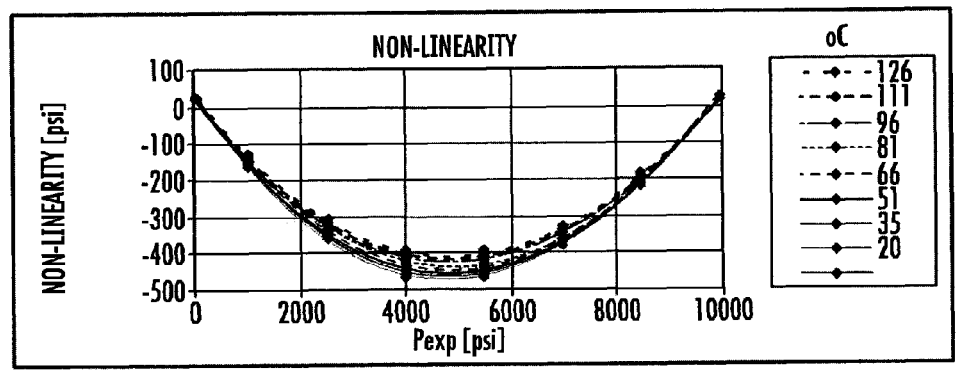

Referring now to FIGS. 16A and 16B, shown therein are graphs which illustrate non-linearity comparisons for the first and second pressure sensors 50 and 52, wherein the non-linearity of the first pressure sensor 50 is shown in FIG. 16A and the non-linearity of the second pressure sensor 52 is shown in FIG. 16B, in accordance with an aspect of the present disclosure. In particular, each curve of the graph corresponds to the non-linearity at various temperatures.

Although the present disclosure has been described with reference to exemplary embodiments and implementations thereof, the present disclosure is not to be limited by or to such exemplary embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

What is claimed is:

1. A flow rate device for measuring the flow rate of a fluid flowing through a wellbore, the flow rate device comprising:
   a differential pressure conduit locatable in the wellbore, the differential pressure conduit defining an internal bore and adapted to create a differential pressure, the differential pressure conduit defining first and second pressure measuring stations axially spaced along the differential pressure conduit;
   a first pressure sensor positioned at the first pressure measuring station, the first pressure sensor having a first Wheatstone bridge adapted to generate a first pressure measurement signal indicative of a first pressure at the first pressure measuring station; and
   a second pressure sensor positioned at the second pressure measuring station, the second pressure sensor having a second Wheatstone bridge adapted to generate a second pressure measurement signal indicative of a second pressure at the second pressure measuring station;
   wherein the first Wheatstone bridge and the second Wheatstone bridge are homogeneous and have similar characteristics with respect to at least one of a temperature sensitivity, a pressure sensitivity, and a non-linearity, the similar characteristics are within a range of 0.01 percent to 10.0 percent.

2. The flow rate device of claim 1, wherein the first Wheatstone bridge is further defined as being configured to include a first signal point and the first pressure measurement signal is generated at the first signal point, the second Wheatstone bridge is configured to include a second signal point and the second pressure measurement signal is generated at the second signal point, and further wherein the first and second signal points are symmetrical with respect to the first and second Wheatstone bridges.

3. The flow rate device of claim 1, further wherein the first and second pressure sensors share a common power source.

4. The flow rate device of claim 1, wherein the first and second Wheatstone bridges are formed using one or more absolute pressure sensors.

5. The flow rate device of claim 4, wherein at least one of the one or more absolute pressure sensors are silicon-on-insulator based sensors.

6. The flow rate device of claim 4, wherein at least one of the one or more absolute pressure sensors are sized within a range of 0.01 millimeter and 1.0 centimeter.

7. The flow rate device of claim 4, wherein at least one of the one or more absolute pressure sensors are sized within a range of 1.0 millimeter and 3.0 millimeter.

8. The flow rate device of claim 1, wherein the similar characteristics are within a range of 0.01 percent to 1.0 percent.

9. The flow rate device of claim 1, wherein the similar characteristics are within a range of 0.5 percent to 1.0 percent.

10. The flow rate device of claim 1, further comprising an electronics common to and in electrical communication with the first and second pressure sensors.

11. A method for monitoring the flow rate of a fluid flowing through a wellbore, comprising the steps of:
   placing a differential pressure conduit in the wellbore, the differential pressure conduit defining an internal bore and adapted to create a differential pressure, the differential pressure conduit defining first and second pressure measuring stations axially spaced along the differential pressure conduit;
   measuring a first pressure at the first pressure measuring station using a first pressure sensor having a first Wheatstone bridge configured to include a first signal point and adapted to generate a first pressure measurement signal indicative of the first pressure measured by the first pressure sensor at the first signal point;
   measuring a second pressure at the second pressure measuring station using a second pressure sensor having a second Wheatstone bridge configured to include a second signal point and adapted to generate a second pressure measurement signal indicative of the second pressure measured by the second pressure sensor at the second signal point; and
   calculating the flow rate of a fluid flowing through the differential pressure conduit by determining the pressure differential between the first and second pressure measuring stations based on the first pressure measurement signal taken from the first signal point and the second pressure measurement signal taken from the second signal point, wherein the first and second signal points are symmetrical with respect to the first and second Wheatstone bridges.

12. The method of claim 11, wherein the first and second Wheatstone bridges are formed using one or more absolute pressure sensors.

13. The method of claim 11, wherein at least one of the one or more absolute pressure sensors are silicon-on-insulator based sensors.

14. The method of claim 12, wherein at least one of the one or more absolute pressure sensors are sized within a range of 0.01 millimeter and 1.0 centimeter.

15. The method of claim 12, wherein at least one of the one or more absolute pressure sensors are sized within a range of 1.0 millimeter and 3.0 millimeter.

16. The method of claim 12, wherein the first and second pressure sensors share a common power source.

17. A system for determining pressure differences of a fluid flowing through a differential pressure conduit positioned in a wellbore, the system comprising:
- a first pressure sensor positioned at a first pressure measuring station, the first pressure sensor having a first Wheatstone bridge adapted to generate a first pressure measurement signal indicative of a first pressure measured by the first pressure sensor at a first signal point; and
- a second pressure sensor positioned at a second pressure measuring station, the second pressure sensor having a second Wheatstone bridge adapted to generate a second pressure measurement signal indicative of a second pressure measured by the second pressure sensor at a second signal point;
- wherein the calculation of the pressure differential between the first and second pressure measuring stations is based on the first pressure measurement signal taken from the first signal point and the second pressure measurement signal taken from the second signal point, wherein the first and second signal points are symmetrical with respect to the first and second Wheatstone bridges.

18. The system of claim 17, wherein the first Wheatstone bridge and the second Wheatstone bridge are homogeneous and have similar characteristics with respect to at least one of a temperature sensitivity, a pressure sensitivity, and a non-linearity, the similar characteristics are within a range of 0.01 percent to 10.0 percent.

19. The system of claim 18, wherein the similar characteristics are within a range of 0.01 percent to 1.0 percent.

20. The system of claim 17, wherein the first and second pressure sensors share a common power source.

21. The system of claim 17, wherein the first and second Wheatstone bridges are formed using one or more absolute pressure sensors.

22. The system of claim 21, wherein at least one of the one or more absolute pressure sensors are silicon-on-insulator based sensors.

23. The system of claim 21, wherein at least one of the one or more absolute pressure sensors are sized within a range of 0.01 millimeter and 1.0 centimeter.

24. The system of claim 21, wherein at least one of the one or more absolute pressure sensors are sized within a range of 1.0 millimeter and 3.0 millimeter.

25. A method comprising the steps of:
- placing, at a first pressure measuring station in a differential pressure conduit adapted to be positioned in a wellbore, a first pressure sensor having a first Wheatstone bridge adapted to generate a first pressure measurement signal indicative of a first pressure measured at the first pressure measuring station; and
- placing, at a second pressure measuring station in the differential pressure conduit, a second pressure sensor having a second Wheatstone bridge adapted to generate a second pressure measurement signal indicative of a second pressure measured at the second pressure measuring station, the differential pressure conduit defining an internal bore and adapted to create a differential pressure at the first and second pressure measuring stations, the first and second pressure measuring stations being axially spaced along the differential conduit;
- wherein the first Wheatstone bridge and the second Wheatstone bridge are homogeneous and have similar characteristics with respect to at least one of a temperature sensitivity, a pressure sensitivity, and a non-linearity, the similar characteristics being within a range of 0.01 percent to 10 percent.

26. The method of claim 25, wherein the similar characteristics are within a range of 0.01 percent to 1.0 percent.

27. The method of claim 25, wherein the first Wheatstone bridge is further defined as being configured to include a first signal point and the first pressure measurement signal is generated at the first signal point, the second Wheatstone bridge is configured to include a second signal point and the second pressure measurement signal is generated at the second signal point, and further wherein the first and second signal points are symmetrical with respect to the first and second Wheatstone bridges, and wherein the method further comprises the step of connecting electronics to the first and second Wheatstone bridges such that the electronics measure the difference between the first signal point and the second signal point.

28. The method of claim 25, wherein the first and second pressure sensors share a common power source.

29. The method of claim 25, wherein the first and second Wheatstone bridges are formed using one or more absolute pressure sensors.

30. The method of claim 29, wherein at least one of the one or more absolute pressure sensors are silicon-on-insulator based sensors.

31. The method of claim 29, wherein at least one of the one or more absolute pressure sensors are sized within a range of 0.01 millimeter and 1.0 centimeter.

32. The method of claim 29, wherein at least one of the one or more absolute pressure sensors are sized within a range of 1.0 millimeter and 3.0 millimeter.

* * * * *